US009115003B2

(12) United States Patent
Vandendoren et al.

(10) Patent No.: US 9,115,003 B2
(45) Date of Patent: Aug. 25, 2015

(54) METHOD FOR INCREASING EVAPORATION RATE OF AN EVAPORATIVE POND USING SOLAR ENERGY

(71) Applicant: SOLVAY SA, Brussels (BE)

(72) Inventors: Alain Vandendoren, Brussels (BE); Jessica A. Mote, Kaycee, WY (US)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 14/132,183

(22) Filed: Dec. 18, 2013

(65) Prior Publication Data

US 2014/0178288 A1 Jun. 26, 2014

Related U.S. Application Data

(60) Provisional application No. 61/740,216, filed on Dec. 20, 2012, provisional application No. 61/740,468, filed on Dec. 21, 2012.

(51) Int. Cl.

| | |
|---|---|
| ***C01D 7/00*** | (2006.01) |
| ***C01D 7/24*** | (2006.01) |
| ***C02F 1/14*** | (2006.01) |
| ***B01D 1/00*** | (2006.01) |
| ***B01D 1/14*** | (2006.01) |
| *C02F 1/12* | (2006.01) |
| *C02F 103/10* | (2006.01) |

(52) U.S. Cl.

CPC ................ *C01D 7/24* (2013.01); *B01D 1/0035* (2013.01); *B01D 1/0058* (2013.01); *B01D 1/14* (2013.01); *C02F 1/14* (2013.01); *C02F 1/12* (2013.01); *C02F 2103/10* (2013.01)

(58) Field of Classification Search

CPC ........... C01D 7/00; C01D 15/08; C01D 17/00

USPC ................................................ 423/421, 426

See application file for complete search history.

(56) References Cited

U.S. PATENT DOCUMENTS

| | | | |
|---|---|---|---|
| 1,853,275 | A | 4/1932 | Houghton et al. |
| 4,039,617 | A | 8/1977 | Kuo |
| 4,116,757 | A | 9/1978 | Garofano et al. |
| 5,624,647 | A | 4/1997 | Zolotoochin et al. |
| 6,027,607 | A | 2/2000 | Corniel |
| 2003/0143149 | A1 | 7/2003 | Braman et al. |

FOREIGN PATENT DOCUMENTS

| | | | |
|---|---|---|---|
| DE | 102010 024725 | A1 | 12/2011 |
| WO | WO 2009/068670 | A1 | 6/2009 |
| WO | WO 2011/151484 | A1 | 12/2011 |

OTHER PUBLICATIONS

Elschner, C.—"American Potash" Mining and Scientific Press (Jan. 29, 1916), vol. 112, pp. 155-156 (2 pages).

U.S. Appl. No. 14/132,149, filed Dec. 18, 2013, Vandendoren et al.

*Primary Examiner* — Edward Johnson

(74) *Attorney, Agent, or Firm* — Beatrice C. Ortego

(57) ABSTRACT

A method for increasing the evaporation rate of an evaporative pond comprising a pond liquor comprising water and at least 1% by weight of sodium carbonate, said evaporative pond being in contact with an ambient air at an ambient air temperature of more than 0° C., the method comprising the following steps: feeding part of the pond liquor to a heat exchanger; heating the pond liquor in the heat exchanger with heat and producing a heated pond liquor; feeding the heated pond liquor into a spraying device at a temperature called hereafter 'operating temperature' of at least 10° C. above the ambient air temperature; and spraying the heated pond liquor into an open area of the evaporative pond with the spraying device, so as to evaporate at least part of the water of the pond liquor when sprayed.

20 Claims, 2 Drawing Sheets

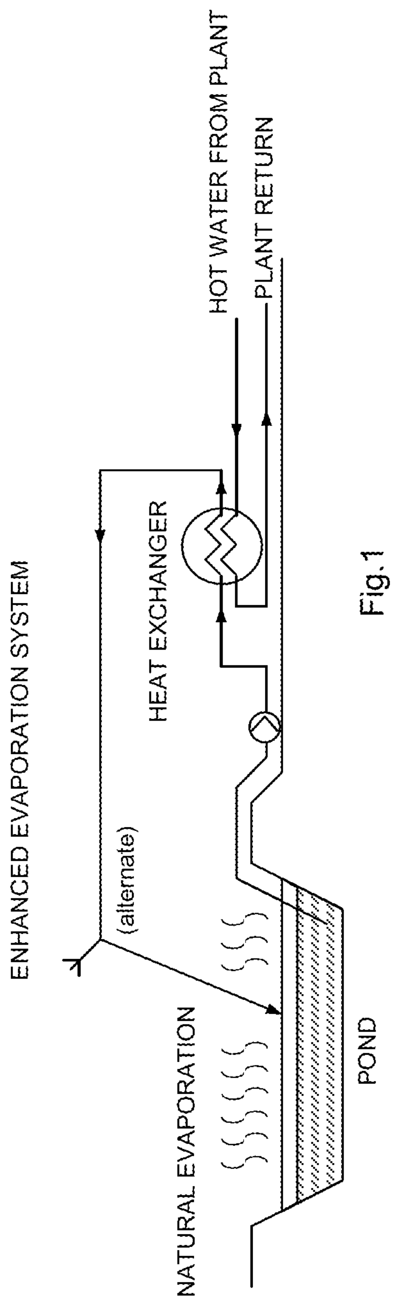
Fig.1
Variant of above
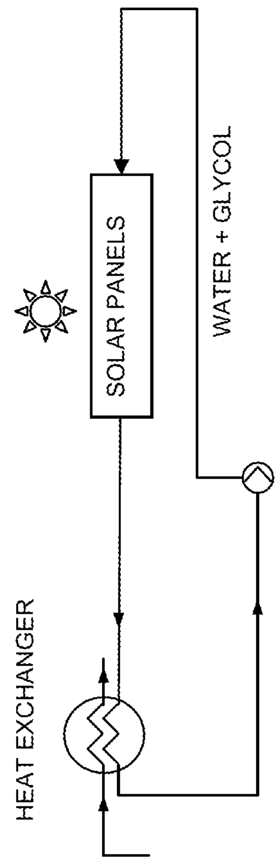

METHOD FOR INCREASING EVAPORATION RATE OF AN EVAPORATIVE POND USING SOLAR ENERGY

CROSS-REFERENCE TO RELATED APPLICATIONS

This application claims priority to U.S. provisional application No. 61/740,216 filed on Dec. 20, 2012 and to U.S. provisional application No. 61/740,468 filed on Dec. 21, 2012, the whole content of these applications being incorporated herein by reference for all purposes.

TECHNICAL FIELD

The invention relates to a method for increasing the evaporation rate of an evaporative pond containing a sodium carbonate pond liquor comprising water using solar energy, to enhance the evaporation rate with wind and unsaturated air of the pond liquor, therefore increasing the time period of the year in which effective evaporation takes place, and reducing the surface needed to treat a given flow of a sodium carbonate aqueous stream that may feed the evaporative pond.

BACKGROUND

Evaporative ponds dimensioning relies mainly among parameters to local water precipitations from rain, ambient air temperature during the year, and the wind velocity conditions forcing heat convection.

One way to accelerate the evaporation is to increase the contact surface between air and the liquor comprising water to be partially evaporated.

Another way to accelerate the evaporation is to increase the temperature of the liquor relatively to the ambient air temperature and its associated dew point. Though heating energy is generally scarcely available nearby evaporative ponds as such ponds are often located at long distances (up to several kilometers) from plants operations. Though operating aqueous solutions comprising sodium carbonate and other soluble salts such as sodium bicarbonate, sodium chloride, or sodium sulfate, leads to fast clogging of equipments and pipes due to hydrated salts formation at low temperature.

Among the industries using evaporative ponds, soda ash production from natural ores or from alkaline lakes is one of them. The main natural ores comprising sodium carbonate and sodium bicarbonate are: trona, nahcolite or wegscheiderite ores. Those natural ores can be found in different geographical areas such as Brazil, China, Kazakhstan, Mexico, Turkey, USA (Wyoming, Colorado, California). Alkaline lakes are found mainly in Africa. Those natural ores can be mechanically mined, for instance using longwall equipments, or be mined by solution mining with water.

The production of soda ash and its derivatives from natural ore or from alkaline lakes results in the production of purge streams containing sodium carbonate. Indeed most of the natural deposits contain impurities such as insoluble particles (sand, clay, calcium carbonate, feldspar, . . . ) and soluble salts mainly evaporite salts (sodium chloride, sodium sulfate, . . . ).

The impurities must be removed from the process lines to guarantee a final product quality required for main uses of soda ash: such as glass production, or food and pharmaceutical production of refined sodium bicarbonate. Most of the soluble impurities such as soluble salts or less soluble compounds are removed from the production process as aqueous solutions or aqueous suspension comprising aqueous solution in different purge streams containing sodium carbonate.

Generally the soluble impurities are removed by a purge control during the crystallization steps in order to guarantee the final soda ash or soda ash derivative quality.

Moreover when using a solution mining an higher amount of water is used per ton of soda ash or soda ash derivatives compared to a conventional dry mining operation, increasing therefore the needs to control the water balance and the evaporation energy optimization when combining evaporative ponds and industrial evaporators fed with steam from a steam generator.

U.S. Pat. No. 1,853,275 (1932) discloses a manufacturing process of sodium carbonate from salt residues of alkaline waters in Owens Lake (California). The document teaches to avoid the building and operating of evaporation ponds to store summer brine of the lake. It teaches to use steam to melt crystals of sodium carbonate decahydrate and sodium chloride in a sodium sulfate rich brine and reach the three solid phases sodium carbonate monohydrate, $Na_2CO_3.2Na_2SO_4$ double salt, and sodium chloride to precipitate double salt to decrease sodium sulfate concentration of the brine. The double salt is removed from the resulting brine and purified sodium carbonate decahydrate is then crystallized. The document is silent on the use of indirect heating by using a heat exchanger combined with solar energy to enhance the evaporation of the evaporation pond. It is also silent on efficient operating conditions to increase the time availability of the equipments.

US2003/0143149 discloses a process for recovering the sodium carbonate from evaporative pond water using heat to heat a sodium carbonate recovery stream before introducing it to an evaporation pond (20). The pond liquor is heated at 120-140° F. (49-60° C.) before being causticized with caustic or quicklime. The described process is silent on the use of spraying device and spraying conditions. It is also silent on multi-ponds operation.

WO2009/068670 from the applicant, discloses an improved method for recovering sodium carbonate decahydrate in tailing ponds using several ponds in order to decrease ponds surfaces and volumes for a given annual flow rate of sodium carbonate effluents. The described process is silent on improved conditions to increase operability of heat exchangers using solar energy.

The present invention aims to propose a method for enhancing the evaporation rate of an evaporative pond using solar energy, presenting improved synergy between operation conditions of heat exchangers, pond liquor compositions, and multi-ponds management.

SUMMARY OF THE INVENTION

The invention relates to a method for increasing the evaporation rate of an evaporative pond comprising a pond liquor comprising water and at least 1% by weight of sodium carbonate, said evaporative pond being in contact with an ambient air at an ambient air temperature of more than 0° C., the method comprising the following steps:

heating a heat exchanger, said heat exchanger comprising a heated part section and a heating part section, with solar energy so that the temperature of the heating part section be at least 15° C., advantageously at least 20° C., more advantageously at least 25° C., preferably at least 30° C., more preferably at least 40° C., even more preferably at least 45° C., feeding part of the pond liquor to the heated part section of the heat exchanger, heating the pond liquor in the heating part section of the heat exchanger to produce a heated pond liquor at an operating temperature of at least 10° C., preferably at least 15° C., more preferably at least 20° C. above the ambient air temperature, feeding the heated pond liquor heated at the operating temperature into an open area of the evaporative pond so that part of the water of the pond liquor evaporates.

A first advantage of the present invention is to improve the operation conditions of indirect heating with heat exchangers using solar energy.

A second advantage of the present invention is the increased evaporation rate of an evaporative pond containing a sodium carbonate pond liquor increasing the annual evaporation rate per surface unit of pond using solar energy and optionally waste heat, therefore limiting the use of fossil energy such as coal.

A third advantage of the present invention is the increased period of time during the year during which evaporation takes place, in particular in the off-season for instance in northern hemisphere (in southern hemisphere seasons should be inversed): early spring (March-April) and late fall (October-November). This almost double the time period of efficient evaporation compared to the main evaporation period (May to September in northern hemisphere, November to March in southern hemisphere) when only natural evaporation is used without using enhanced evaporation systems and heat.

A fourth advantage of the present invention is to increase the convection locally in the evaporative pond areas where the pond liquor is removed to be fed into the heat exchanger and where it is fed back to the pond; this generates more uniform concentrations of the pond liquor in the evaporative pond and this improves also the convection and evaporation at the ambient air/pond liquor interfaces, and calories exchange at the surface of the pond during colder nights or days.

A fifth advantage of the present invention is the possibility of combined synergy between evaporative ponds of liquors containing sodium carbonate and low temperature heat of solar energy or waste heat from a soda ash plant using solution mining.

A sixth advantage of the present invention is the synergy between such enhanced evaporation methods with increased concentration of sodium chloride or sodium sulfate in the generated sodium carbonate liquor in the evaporative pond, enabling to reduce the clogging speed of heat exchangers. This is also particularly advantageous when enhanced evaporation devices are combined with multi-ponds management techniques such as techniques using at least one decahydrate sodium carbonate crystallizing pond associated with an evaporative pond and/or an evaporative-double salt crystallizing pond.

A seventh advantage of the present invention is the possibility using solar energy to decrease the cost and $CO_2$ foot print of truck transport of reclaimed pond solid comprising sodium carbonate decahydrate for its transport up to a soda ash plant, using rather pipes and pumps.

A eighth advantage of the present invention is the possibility to use a heating pump, with or without using solar energy, to recover part of the heat generated during sodium carbonate decahydrate crystallization in a crystallizing pond and bring back part of this heat to an evaporative pond comprising an impure pond solid comprising sodium carbonate hydrates, sodium chloride and/or sodium sulfate to accelerate or increase the melting of the impure pond solid and therefore increasing the possibility to reclaim such pond solid into purer sodium carbonate decahydrates with low consumption of energy.

BRIEF DESCRIPTION OF THE DRAWINGS

FIG. 1 is a schematic illustration of an embodiment of the method in accordance with the principles of the present invention.

DEFINITIONS

Figure 2:
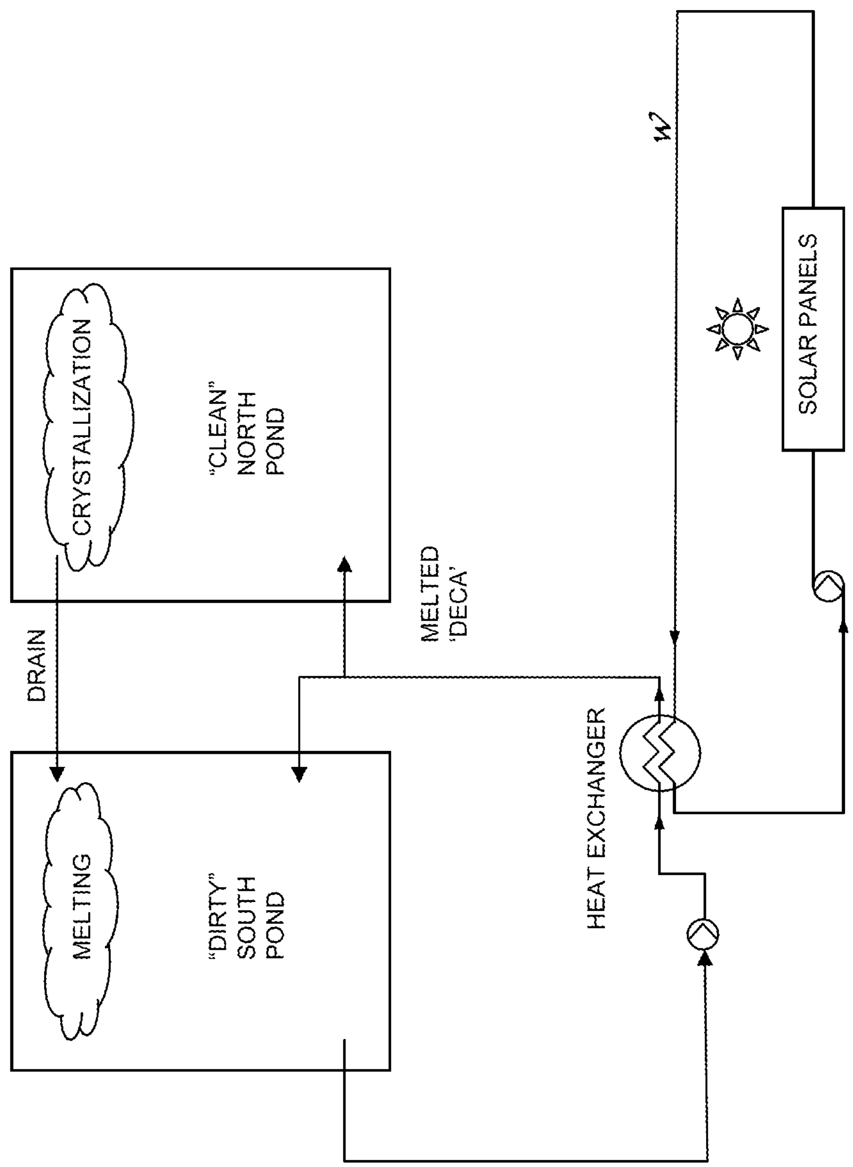
FIG. 2 is a schematic illustration of an embodiment of the method in accordance with the principles of the present invention.

The term 'solubility' refers to the water solubility of a compound in an aqueous solution.

The term 'soda ash' refers to sodium carbonate, generally contemplated in its anhydrous solid form ($Na_2CO_3$).

The term 'soda ash derivatives' refers to chemical compounds synthesized from soda ash used as starting material, including: sodium bicarbonate, sodium sesquicarbonate ($Na_2CO_3.2NaHCO_3.2H_2O$), wegscheiderite or decemite ($Na_2CO_3.3NaHCO_3$), caustic soda (NaOH) from causticization with lime, sodium sulfite, sodium bisulfate, sodium metabisulfite, sodium sulfate, sodium phosphate.

The term 'double salt' refers to sodium carbonate-sodium sulfate double salt ($Na_2CO_3.2Na_2SO_4$ also called burkeite) unless specified otherwise. The term 'comprising' includes 'consisting essentially of" and also consisting of".

In the present description, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

When the term "about" is used before a quantitative value, the present teachings also include the specific quantitative value itself, unless specifically stated otherwise. As used herein, the term "about" refers to a +−10% variation from the nominal value unless specifically stated otherwise.

DETAILED DESCRIPTION OF THE INVENTION

The invention relates to a method for increasing the evaporation rate of an evaporative pond comprising a pond liquor comprising water and at least 1% by weight of sodium carbonate, said evaporative pond being in contact with an ambient air at an ambient air temperature of more than 0° C., the method comprising the following steps:

heating a heat exchanger, said heat exchanger comprising a heated part section and a heating part section, with solar energy so that the temperature of the heating part section be at least 15° C., advantageously at least 20° C., more advantageously at least 25° C., preferably at least 30° C., more preferably at least 40° C., even more preferably at least 45° C., feeding part of the pond liquor to the heated part section of the heat exchanger, heating the pond liquor in the heating part section of the heat exchanger to produce a heated pond liquor at an operating temperature of at least 10° C., preferably at least 15° C., more preferably at least 20° C. above the ambient air temperature, feeding the heated pond liquor heated at the operating temperature into an open area of the evaporative pond so that part of the water of the pond liquor evaporates.

In the present invention the sodium carbonate pond liquor is an aqueous liquor comprising sodium carbonate. The pond liquor generally comprises less than 36% by weight of sodium carbonate. In one embodiment of the invention the pond liquor comprises at most 30%, advantageously at most 25%, more advantageously at most 18%, even more advantageously at most 10% by weight of sodium carbonate.

The remaining of the pond liquor is mainly water. Sodium carbonate may be partly carbonated with atmospheric $CO_2$. Though in present invention, it is preferable that the pond liquor comprises at most 4%, advantageously at most 3%, more advantageously at most 2%, even more advantageously at most 1% by weight of sodium bicarbonate. This improves the duration of operation of the heat exchanger before regeneration or washing. In a particular embodiment, the pond liquor comprises at most 18% sodium carbonate and at most 3% sodium bicarbonate, or at most 10% sodium carbonate and at most 4% sodium bicarbonate.

The pond liquor may also contain other soluble salts than sodium carbonate, such as sodium chloride and/or sodium sulfate. In such case the pond liquor comprises generally from 1 to 25% in weight of other soluble salts, in particular from 1 to 25% in weight of sodium chloride and/or sodium sulfate. When the pond liquor comprises sodium chloride and sodium sulfate it is preferred that the pond liquor comprises at most 25% in weight of cumulative concentrations of both said soluble salts.

In the present invention, the pond liquor is preferably not saturated in sodium chloride and/or sodium sulfate and/or sodium sesquicarbonate at the ambient air temperature. When the ambient temperature drops down during the night, or a cold day, the pond liquor if saturated in a sodium salt is saturated mainly in sodium carbonate decahydrate. In particular it is not saturated in sodium chloride or in double salt or in sodium sesquicarbonate. It has been observed that a pond liquor in such concentration domain enables to decrease the clogging speed of enhance evaporation devices such as heat exchangers, pumps and pipes. It enables also a faster recovering of thermal exchange during regeneration of heat exchangers and associated devices with sequential over-heating or with sequential water feeding operations described hereafter in the present document.

The pond liquor is advantageously a decanted liquor having less than 1%, more advantageously less than 0.1% by weight of solid content such as solid particles of sand, clay, or fine soluble salt crystals. When a spraying device is used in combination with present method, particle size of solid particles in the liquor should advantageously be the third, more advantageously the tenth of the smaller space cord distance inside the spraying device. This enables to improve spraying duration of the spraying device and limits efficiently the clogging of the spraying device within its internal parts.

The heat exchanger may be any type of heat exchanger known in the art of the chemical industry. In present invention a spiral heat exchanger or a plate and frame exchanger or a tube and frame exchanger are particularly suited. The heat exchanger is advantageously chosen among dismountable heat exchangers such as spiral heat exchanger or plate and frame heat exchanger. This enables to clean the heat exchanger surfaces from building up solid particles crusts or soluble salts crystals such as: sodium carbonate monohydrate crystals, sodium carbonate heptahydrate crystals, sodium carbonate decahydrate crystals, sodium sulfate decahydrate crystals, sodium bicarbonate, sodium sesquicarbonate, and burkeite ($Na_2CO_3.2Na_2SO_4$).

Heat exchangers are equipments that enable the heat transfer from one medium (the heating medium) to another medium (the heated medium). Therefore generally a heat exchanger comprises a heated part section and a heating part section. For instance in a shell-and-tube exchanger, one medium is inside the tube, the other medium is outside the tube and inside the shell. If the heating medium is outside the tube, an heating part section may be defined by the volume occupied by the heating medium, and an heated part section may be defined by the volume occupied by the heated medium comprising the inside volume of the tube. In present invention the heated medium is the pond liquor.

In the present specification of the invention, the temperature of the heating part section is the temperature of the entering heating medium into the heating part section. If there are multiple inlets of heating medium, the temperature of the heating part section is the mean temperature of the heating medium weighted by the respective flows entering the different inlets.

The operating temperature of the produced heated pond liquor is in present specification the temperature of the heated pond liquor exiting the heat-exchanger. If there are multiple outlets of heated liquor, the temperature of the heated part section is the mean temperature of the heated liquor weighted by the respective flows of the different outlets.

In present invention it has been observed that a too low ambient air temperature leads to a fast crystallization of sodium carbonate/bicarbonate/sulfate crystals or their hydrate crystals on the outlet of the heat exchanger or of the pipe outlet back to the open area of the evaporative pond, leading to a fast clogging of such outlet. In present invention, the ambient air temperature is advantageously at least 5° C., preferably at least 10° C., more preferably at least 15° C.

In order to reduce the size of the heat exchanger, the temperature of the heating part section should be as high as possible. The temperature of the heating par section is dependant on the available local solar energy and on the chosen solar energy collector surface. In present method the operating temperature is at least 10° C., advantageously at least 20° C., preferably at least 30° C., more preferably at least 35° C.

Though during cold season if sun exposition or intensity is not sufficient to heat enough the heating part section of the heat exchanger, and/or the pond liquor at the above specified temperatures, the invention should not be operated and the heat exchanger should be emptied from pond liquor to avoid the freezing of the aqueous pond liquor that would be detrimental to the heat exchanger and to associated equipments.

Also too high operating temperatures related to the heated pond liquor should be also avoided. Above 37° C., stable crystalline form in saturated solution in sodium carbonate is sodium carbonate monohydrate that has a decreased solubility versus temperature, therefore inducing the fouling of the heat exchanger. In present method the operating temperature is at most 95° C., advantageously at most 75° C., preferably at most 60° C., more preferably at most 48° C.

In one embodiment of the present invention the operating temperature is advantageously at least 15° C. and at most 95° C., more advantageously at least 20° C. and at most 75° C., preferably at least 30° C. and at most 60° C., more preferably at least 35° C. and at most 48° C.

The inventors have observed, particularly when the ambient air temperature is lower than 35° C., as during off seasons (spring and fall), in particular also when the operating temperature is lower than 37° C., that a sequential over-heating during a short time, such as 5 to 10 minutes every two hours or preferably every hour, of the heated pond liquor enable to increase substantially the operating duration of heat exchanger before clogging. Therefore in one embodiment of the invention, the heated pond liquor is sequentially heated at a sequential temperature before being fed into the open area of the evaporative pond, and wherein the sequential temperature is at least 5° C., advantageously at least 10° C., preferably at least 15° C. above the operating temperature. The heated pond liquor is sequentially heated at the sequential temperature during a sequential heating time that is generally at least 5 seconds, advantageously at least 30 seconds, more advantageously 2 minutes, most advantageously at least 5 minutes. Usually the heated pond liquor is sequentially heated at the sequential temperature with a sequential period of at most 12 hours, advantageously at most 5 hours, more advantageously at most 2 hours, most advantageously at most 1 hour.

In present method, the solar energy may collected as photovoltaic energy and then transformed into heat for instance by electric resistances, though in a preferred embodiment of the method the solar energy is solar heat collected by a solar heat collector. The solar heat collector may be selected from the group consisting of flexible solar panel, flexible strip solar panel, helicoïdal tube hemispherical panel, metal glass vacuum tubes solar panel, dark colored surface, dark colored corrugated surface, dark colored three dimensional surface, or dark colored partly hemispherical surface.

Advantageously, the pond liquor defines a surface level inside the evaporative pond and the solar collector is situated above the surface level so as to render possible the purge of the solar collector during freezing season.

In one embodiment the heat exchanger is the solar heat collector. Therefore the solar collector is directly fed with the pond liquor. In that case the heat exchanger is the solar heat collector. And the heated part section of the heat exchanger is the heated surface of the solar heat collector. In a particular embodiment, the solar collector is a dark colored surface which is positioned so as to be inclined relatively to the horizontal level and on which the pond liquid is distributed so that at least part of the dark colored surface is wetted with the pond liquid and on which the pond liquid is heated, and from which the heated pond liquid is collected back to a the tailings pond or back to a subsequent waste pond.

In one embodiment the heat exchanger is different from the solar heat collector, and the solar heat collector heats an intermediate heated fluid such as water and glycol, and the intermediate heated fluid heats the heated part of the heat exchanger.

In one embodiment the heating of the heat exchanger with solar energy is complemented with heat selected from the group consisting of hot steam condensate, low pressure steam of less than 3.5 bars, and combination thereof. This is particularly advantageous when such heat is available near by the evaporative pond, so as to complement the solar energy when cloudy sky occurs during off season to avoid to clog the heated pond liquor into the heat exchanger. In a particular embodiment of this one embodiment the hot steam condensate or low pressure steam of less than 3.5 bar after providing heat to the heat exchanger is(are) transformed into a cooled condensate and the cooled condensate is further used to recover heat from fumes of a steam generator. In another particular embodiment of this one embodiment, the heat is generated by a gas fired heater fuelled by a mine methane recovered from a longwall gob vent and/or from mine ventilation air; more advantageously the mine methane recovered from a longwall gob vent is produced during a non-combustible ore longwall mining operation, advantageously during a trona ore longwall mining operation.

In one embodiment of the present invention, water, preferably steam condensate, more preferably steam condensate at a temperature of at least 35° C., is sequentially fed to the heated part section of the heat exchanger in replacement of at least part of the heated pond liquor, preferably at least 1 minute per period of 8 hours, more preferably at least 1 minute per period of 4 hours. Advantageously water, preferably the steam condensate, more preferably the steam condensate at a temperature of at least 35° C., is sequentially fed to the heated part section of the heat exchanger in replacement of at least part of the heated pond liquor at most 20 minutes per period of 8 hours, more preferably at most 10 minutes per period of 4 hours.

Other advantageous embodiments are described in the claims 24 to 37 of priority U.S. provisional application No. 61/740,468 filed on Dec. 21, 2012 being incorporated herein by reference.

In one embodiment of the present method, the sodium carbonate pond liquor contains also sodium chloride and/or sodium sulfate. Advantageously when the sodium carbonate aqueous stream contains sodium chloride and/or sodium sulfate, the method further comprises purging part of the pond liquor into a subsequent pond so as to control the sodium chloride or the sodium sulfate concentration in the pond liquor. The pond liquor comprises generally at least 2%, or at least 4%, or at least 6%, or at least 8% by weight of sodium chloride, or of sodium sulfate, or of sodium chloride and sodium sulfate. In a first sub-embodiment of the present one embodiment, the pond liquor comprises at most 20%, advantageously at most 10% by weight of sodium chloride, or of sodium sulfate. In a second sub-embodiment of the present one embodiment, the pond liquor comprises at most 10% by weight of sodium chloride and at most 4% of sodium sulfate. This enables to limit the presence of sodium sulfate in sodium carbonate decahydrate crystals by formation of co-crystallized double salt ($Na_2CO_3.2Na_2SO_4$).

In a particular embodiment of the present invention, the evaporative pond is fed with a sodium carbonate aqueous stream for recovering partly or totally the sodium carbonate from the sodium carbonate aqueous stream.

In a first variant of the particular embodiment, the sodium carbonate aqueous stream is an aqueous solution from a solution mining process, generally a trona ore or a nahcolite ore or a wegscheiderite ore solution mining, preferably a trona ore solution mining, and wherein the sodium carbonate aqueous stream comprises at least 1%, advantageously at least 6% and comprises at most 30% by weight of sodium carbonate. Using the method of the present invention to such sodium carbonate aqueous stream feeding the evaporative pond enables to concentrate the aqueous solution from the solution mining process. The pond liquor obtained in the evaporative pond may then be cooled down to provide crystallization promoting conditions of sodium carbonate decahydrate. Advantageously the pond liquor is cooled down by exposing the pond liquor to an ambient temperature of less than 10° C., preferably less than 2° C., using one of the methods described in WO2009/068670 page 2 line 21 to page 4 line 31, included here by reference, and wherein the pond liquor is the provided "effluent".

In a second variant of the particular embodiment, the sodium carbonate aqueous stream comprises, or consists essentially of, or consists of: an aqueous purge from a sodium carbonate crystallizer or a sodium carbonate derivative crystallizer, and comprises at least 6% and at most 30% by weight of sodium carbonate. In this second variant, the sodium carbonate aqueous stream may also derived from an aqueous solution from a solution mining process, such as a trona ore, or a nahcolite ore, or wegscheiderite ore solution mining, preferably a trona ore solution mining. This is the case for instance when the sodium carbonate crystallizer or the sodium carbonate derivative crystallizer, such as a sodium carbonate monohydrate crystallizer or a sodium sesquicarbonate crystallizer or a sodium bicarbonate crystallizer, are fed with an aqueous solution deriving from a solution mining process. Using the method of the present invention to such sodium carbonate aqueous stream feeding the evaporative pond enables to concentrate the aqueous solution comprising or consisting of the aqueous purge. The pond liquor obtained in the evaporative pond may then be cooled down to provide crystallization promoting conditions of sodium carbonate decahydrate.

Preferably in this second variant, the pond liquor is cooled down by exposing the pond liquor to an ambient temperature of less than 10° C., preferably less than 2° C., using one of the methods described in WO2009/068670 page 2 line 21 to page 4 line 31, included here by reference, and wherein the pond liquor is the provided "effluent".

In a third variant of the particular embodiment, the sodium carbonate aqueous stream is generated in a first pond wherein a sodium carbonate aqueous effluent, advantageously a sodium carbonate aqueous effluent comprising or consisting of a sodium carbonate aqueous purge from a sodium carbonate crystallizer or from a sodium carbonate derivative crystallizer, is fed to the first pond, the sodium carbonate aqueous effluent is cooled down so as to generate:

sodium carbonate decahydrate crystals, and the sodium carbonate aqueous stream.

The sodium carbonate aqueous stream is then drained off from the first pond. The sodium carbonate aqueous stream is then fed, according the present invention, in the evaporative pond. The sodium decahydrate crystals are removed at least partly from the first pond. Advantageously this first pond provides a "crystallizing pond" or a "first pond" according one of the methods described in WO2009/068670 from page 2, line 21 to page 4, line 31, incorporated herein by reference.

In a first another embodiment of the present invention and of any embodiment, variant and sub-embodiment above described, the method of present invention advantageously further comprises the steps of:

stopping the feeding of the part of the pond liquor to the heat exchanger and to the spraying device before reaching a saturated pond liquor in sodium salts at the ambient air temperature, allowing the water of the pond liquor to further evaporate by further exposing the pond liquor to ambient air conditions, typically during the summer months, in the same evaporative pond or in a further evaporative crystallization pond area so as to crystallize further sodium salts comprising sodium chloride or sodium sulfate.

Or alternatively of the first another embodiment, therefore in a second another embodiment of the present invention and of any embodiment, variant and sub-embodiment above described, the method advantageously further comprises the steps of:

stopping the feeding of the part of the pond liquor to the heat exchanger and to the spraying device before reaching a saturated pond liquor in sodium salts at the ambient air temperature, feeding the pond liquor to a solution mining cavity or a mined out cavity or in a deep well injection.

The present method relates also to a method for reclaiming a pond solid in an evaporative pond, said pond solid comprising sodium carbonate hydrate, sodium chloride and/or sodium sulfate and a pond liquor, said pond liquor comprising at least 6% by weight of sodium carbonate, and said evaporative pond being in contact with an ambient air at an ambient air temperature of more than 0° C. and at most 20° C., the method comprising the following steps:

heating a heat exchanger, said heat exchanger comprising a heated part section and a heating part section, with solar energy so that the temperature of the heating part section be at least 15° C., advantageously at least 20° C., more advantageously at least 25° C., preferably at least 30° C., more preferably at least 40° C., even more preferably at least 45° C., feeding part of the pond liquor to the heated part section of the heat exchanger, heating the pond liquor in the heating part section of the heat exchanger to produce a heated pond liquor at an operating temperature of at least 10° C., preferably at least 15° C., more preferably at least 20° C. above the ambient air temperature, feeding part of the heated pond liquor heated at the operating temperature into an open area of the evaporative pond so that part of pond solid melt, feeding another part of the heated pond liquor heated at the operating temperature into a crystallization pond area so that part of the sodium carbonate of the pond liquor in contact with the ambient air crystallizes into sodium carbonate decahydrate, purging part of the crystallization pond area solution comprising sodium chloride, and/or sodium sulfate, water and a depleted amount of sodium carbonate to an evaporative pond, harvesting part of the sodium carbonate decahydrate of the crystallization pond area.

To improve the operation duration of the heat exchanger using solar energy and/or also improves the harvesting of sodium decahydrate in the crystallization pond, the concentration of sodium bicarbonate in the pond liquor should be limited. Advantageously the pond liquor comprises at most 4%, advantageously at most 3%, more advantageously at most 2%, even more advantageously at most 1% by weight of sodium bicarbonate.

In an embodiment, the method of present invention further comprises using a heat pump and means to recover heat from the crystallization of sodium carbonate decahydrate in the crystallizing pond and means to bring part of the heat from the crystallization of sodium carbonate decahydrate to the evaporation pond so that the pond solid melt in higher quantity and/or faster than without using the heat pump.

An embodiment using such a combination of use of solar energy heating and a heating pump in the present method is exemplified at FIG. 2.

The present invention also relates to a method for decreasing the cost of truck transportation of a reclaimed pond solid comprising sodium carbonate decahydrate comprising:

f) harvesting the reclaimed pond solid g) feeding part of the harvested reclaimed pond solid to melter maintained at a temperature of at least about 20° C., preferably at least about 25° C., more preferably at least about 30° C., most preferred at least 35° C., so as to produce a melter liquor, h) feeding part of the melter liquor to a heat exchanger, i) heating the melter liquor in the heat exchanger with a waste heat so as to produce a heated melter liquor, j) removing part of the heated melter liquor and transporting the part of the heated melter liquor providing a feedstock to a process which produces sodium carbonate, or a sodium carbonate derivative, k) feeding the remaining part of the heated melter liquor back to the melter so as to melt part of the reclaimed pond solid, wherein the reclaimed pond solid comprising sodium carbonate decahydrate is produced in a at least 2 ponds management process, said 2 ponds management process comprising:

a) providing a sodium carbonate aqueous effluent, advantageously a sodium carbonate aqueous effluent comprising a purge from the process which produces sodium carbonate, or a sodium carbonate derivative, b) providing a cooling crystallization pond and an evaporative crystallization pond, c) feeding the sodium carbonate aqueous effluent into the cooling crystallization pond, d) cooling down the sodium carbonate aqueous effluent by exposing it to an ambient air temperature of less than 10° C., preferably of less than 2° C., so as to promote sodium carbonate decahydrate cooling crystallization conditions, such as during the cool ambient temperature of the winter season, and so as to generate (1) the pond solid to be reclaimed comprising sodium carbonate decahydrate crystals and (2) a pond liquor comprising sodium carbonate and another solubilised sodium salt such as sodium chloride or sodium sulfate or a sodium carbonate derivative salt, e) draining off the pond liquor of the cooling crystallizing pond and feeding it to the evaporative crystallization pond, f) harvesting the reclaimed solid from the cooling crystallizing pond which is further processed according above steps g) to k), l) exposing the pond liquor in the evaporative crystallization pond to a second ambient air conditions, such as ambient air conditions during summer months, so as to promote an evaporation of at least part of the water of the pond liquor and to crystallize sodium carbonate and another sodium salt such as sodium chloride, sodium sulfate or sodium carbonate derivative salt.

The scope of protection is not limited by the description set out above, but is only limited by the claims which follow, that scope including all equivalents of the subject matter of the claims.

Each and every claim is incorporated into the specification as an embodiment of the present invention. Thus, the claims are a further description and are an addition to the preferred embodiments of the present invention, in particular the claims of the priority U.S. provisional application No. 61/740,216 and U.S. provisional application No. 61/740,468 specified at the beginning of this description, and included hereby reference.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Should the disclosure of any patents, patent applications, and publications which are incorporated herein by reference conflict with the description of the present application to the extent that it may render a term unclear, the present description shall take precedence.

The invention claimed is:

1. A method for increasing the evaporation rate of an evaporative pond comprising a pond liquor, said pond liquor comprising water and at least 1% by weight of sodium carbonate, said evaporative pond being in contact with an ambient air at an ambient air temperature of more than 0° C., said method comprising the following steps:

heating a heat exchanger, said heat exchanger comprising a heated part section and a heating part section, with solar energy so that the temperature of said heating part section is at least 15° C.;

feeding at least a part of said pond liquor to said heated part section of said heat exchanger;

heating said pond liquor in said heating part section of said heat exchanger to produce a heated pond liquor at an operating temperature of at least 10° C. above the ambient air temperature, and at most 48° C.; and feeding said heated pond liquor heated at the operating temperature into an open area of said evaporative pond so that part of the water of said pond liquor evaporates.

2. The method according to claim 1 wherein said pond liquor comprises at most 30% by weight of sodium carbonate.

3. The method according to claim 1 wherein said pond liquor comprises at most 4% by weight of sodium bicarbonate.

4. The method according to claim 3 wherein said pond liquor comprises at most 18% sodium carbonate and at most 3% sodium bicarbonate, or comprises at most 10% sodium carbonate and at most 4% sodium bicarbonate.

5. The method according to claim 1 wherein the ambient air temperature is at least 15° C.

6. The method according to claim 1 wherein the operating temperature is at least 30° C.

7. The method according to claim 1 wherein said heated pond liquor is sequentially heated at a sequential temperature before being fed into said open area of said evaporative pond, and wherein the sequential temperature is at least 5° C. above the operating temperature.

8. The method according to claim 5 wherein said heated pond liquor is sequentially heated at a sequential temperature during a sequential heating time, and wherein the sequential heating time is at least 5 seconds.

9. The method according to claim 1 wherein said solar energy is solar heat collected by a solar heat collector being selected from the group consisting of flexible solar panel, flexible strip solar panel, helicoïdal tube hemispherical panel, metal glass vacuum tubes solar panel, dark colored surface, dark colored corrugated surface, dark colored three dimensional surface, and dark colored partly hemispherical surface.

10. The method according to claim 9 wherein said heat exchanger is said solar heat collector.

11. The method according to claim 9 wherein said pond liquor defines a surface level inside said evaporative pond, and wherein said solar collector is situated above the surface level so as to render possible a purge of the solar collector during freezing season.

12. The method according to claim 9 wherein said solar collector is a dark colored surface which is positioned so as to be inclined relatively to the horizontal level and on which said pond liquid is distributed so that at least part of the dark colored surface is wetted with said pond liquid and on which said pond liquid is heated, and from which said heated pond liquid is collected back to said tailings pond or back to a subsequent waste pond.

13. The method according to claim 9 wherein said heat exchanger is different from said solar heat collector; wherein said solar heat collector heats an intermediate heated fluid; and wherein said intermediate heated fluid heats said heated part of the heat exchanger.

14. The method according to claim 1 wherein the heating of said heat exchanger with solar energy is complemented with heat selected from the group consisting of hot steam condensate, low pressure steam of less than 3.5 bars, heat generated by a gas fired heater fuelled by a mine methane recovered from a longwall gob vent, heat generated by a gas fired heater fuelled by a mine methane recovered from mine ventilation air, and combination thereof.

15. The method according to claim 1 wherein said sodium carbonate aqueous stream is an aqueous solution from a solution mining process, selected from the group consisting of: a trona ore solution mining process, a nahcolite ore solution mining process, and a wegscheiderite ore solution mining process.

16. The method according to claim 1 further comprising the steps of:

stopping the feeding of the part of said pond liquor to said heat exchanger before reaching a saturated pond liquor in sodium salts at the ambient air temperature, and feeding said pond liquor to a solution mining cavity or a mined out cavity or in a deep well injection.

17. The method according to claim 1 wherein said sodium carbonate aqueous stream is generated in a first pond, wherein a sodium carbonate aqueous purge from a sodium carbonate crystallizer or from a sodium sesquicarbonate or from a sodium bicarbonate crystallizer is fed to said first pond, and wherein said sodium carbonate aqueous purge is cooled down in the first pond so as to form:

sodium carbonate decahydrate crystals and/or sodium sesquicarbonate crystals, and the sodium carbonate aqueous stream.

18. A method for reclaiming a pond solid in an evaporative pond, said pond solid comprising sodium carbonate hydrate, sodium chloride and/or sodium sulfate and a pond liquor, said pond liquor comprising at least 6% by weight of sodium carbonate, and said evaporative pond being in contact with an ambient air at an ambient air temperature of more than 0° C. and at most 20° C., the method comprising the following steps:

heating a heat exchanger, said heat exchanger comprising a heated part section and a heating part section, with solar energy so that the temperature of the heating part section be at least 15° C., feeding part of said pond liquor to said heated part section of said heat exchanger, heating said pond liquor in said heating part section of said heat exchanger to produce a heated pond liquor at an operating temperature of at least 10° C. above the ambient air temperature, feeding part of said heated pond liquor heated at the operating temperature into an open area of said evaporative pond so that part of pond solid melts, feeding another part of said heated pond liquor heated at the operating temperature into a crystallization pond area so that part of the sodium carbonate of said pond liquor in contact with the ambient air crystallizes into sodium carbonate decahydrate, purging part of the crystallization pond area solution comprising sodium chloride, and/or sodium sulfate, water and a depleted amount of sodium carbonate to an evaporative pond, and harvesting part of the sodium carbonate decahydrate of said crystallization pond area.

19. A method for decreasing the cost of truck transportation of a reclaimed pond solid, comprising sodium carbonate decahydrate crystals produced from a sodium carbonate aqueous stream, said method comprising:

harvesting said reclaimed pond solid, feeding part of said harvested reclaimed pond solid to a melter maintained at a temperature of at least about 20° C. so as to produce a melter liquor, heating a heat exchanger, said heat exchanger comprising a heated part section and a heating part section, with solar energy so that the temperature of the heated part section is at least 20° C., feeding part of the melter liquor to said heated part section of the heat exchanger, heating the melter liquor in said heat exchanger with solar energy so as to produce a heated melter liquor, removing part of the heated melter liquor, transporting the part of the heated melter liquor providing a feedstock to a process which produces sodium carbonate, or sodium bicarbonate, or sodium sulfite, or other derivatives, and feeding the remaining part of the heated melter liquor back to the melter so as to melt part of said reclaimed pond solid, wherein part of the sodium carbonate decahydrate crystals of said reclaimed pond solid are produced according the method of claim 17, therefore in an at least 2 ponds management process.

20. A process for manufacturing sodium carbonate or a sodium carbonate derivative comprising carrying out the method according to claim 1.

* * * * *